United States Patent
Dikov et al.

(10) Patent No.: US 12,430,779 B2
(45) Date of Patent: Sep. 30, 2025

(54) DEPTH ESTIMATION USING IMAGE AND SPARSE DEPTH INPUTS

(71) Applicant: QUALCOMM Incorporated, San Diego, CA (US)

(72) Inventors: Georgi Dikov, Amsterdam (NL); Mohsen Ghafoorian, Diemen (NL); Joris Johannes Lambertus Van Vugt, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/153,480

(22) Filed: Jan. 12, 2023

(65) Prior Publication Data
US 2024/0135559 A1      Apr. 25, 2024

Related U.S. Application Data

(60) Provisional application No. 63/418,837, filed on Oct. 24, 2022.

(51) Int. Cl.
*G06T 7/50* (2017.01)
*G06T 7/73* (2017.01)

(52) U.S. Cl.
CPC ............ *G06T 7/50* (2017.01); *G06T 7/73* (2017.01); *G06T 2207/20016* (2013.01); *G06T 2207/20084* (2013.01)

(58) Field of Classification Search
CPC ... G06T 7/50; G06T 7/73; G06T 2207/20016; G06T 2207/20084; G06T 2207/10024; G06T 2207/10028

(Continued)

(56) References Cited

U.S. PATENT DOCUMENTS

| | | | |
|---|---|---|---|
| 2020/0193623 A1* | 6/2020 | Liu | G06N 3/04 |
| 2022/0292289 A1* | 9/2022 | Shalumov | G06F 18/214 |

(Continued)

FOREIGN PATENT DOCUMENTS

| | | | | |
|---|---|---|---|---|
| CN | 111062416 | * | 9/2021 | G06F 18/23213 |
| CN | 109685842 | * | 3/2023 | G06T 7/593 |

OTHER PUBLICATIONS

Eldesokey A., et al., "Confidence Propagation through CNNs for Guided Sparse Depth Regression", arXiv:1811.01791v1 [cs.CV], Arxiv.org, Cornell University Library, 201 Olin Library Cornell University Ithaca, NY 14853, Nov. 5, 2018, pp. 1-12, XP081454781, Abstract, Figures 1,7(a),7(b).

(Continued)

*Primary Examiner* — Jerome Grant, II
(74) *Attorney, Agent, or Firm* — Polsinelli LLP/QUALCOMM Incorporated

(57) ABSTRACT

Systems and techniques are provided for generating depth information from one or more images. For instance, a method can include obtaining an image of a scene and obtaining depth information associated with one or more objects in the scene. The method can include processing, using an encoder of a neural network model, the image and the depth information to generate a feature representation of the image and the depth information. The method can further include processing, using a decoder of the neural network model, the feature representation of the image and the depth information to generate a depth output corresponding to the image.

28 Claims, 11 Drawing Sheets

(58) Field of Classification Search
USPC .......................................................... 382/106
See application file for complete search history.

(56) References Cited

U.S. PATENT DOCUMENTS

2023/0093827 A1* 3/2023 Huang ...................... G06T 7/60
                                                      382/106
2024/0095937 A1* 3/2024 Unger ...................... G06T 7/50

OTHER PUBLICATIONS

Huang Z., et al., "HMS-Net: Hierarchical Multi-scale Sparsity-invariant Network for Sparse Depth Completion", arXiv:1808.08685v1 [cs.CV], Arxiv.org, Cornell University Library, 201 Olin Library Cornell University Ithaca, NY 14853, Aug. 27, 2018, pp. 1-12, XP081603598, Abstract, Figure 2, Sections: 3.1 Sparsity-invariant Convolution, 3.2.3 Joint Sparsity-invariant Concatenation and Convolution, p. 7, Left-hand Column.
International Search Report and Written Opinion—PCT/US2023/074092—ISA/EPO—Dec. 22, 2023.
Jaritz M., et al., "Sparse and Dense Data with CNNs: Depth Completion and Semantic Segmentation", 2018 International Conference on 3D Vision, IEEE, Sep. 5, 2018, pp. 52-60, XP033420090, Abstract, Figure 1, Sections: 3. Method, 3.1. Network architecture, 3.2. Analysis of Validity Mask.

* cited by examiner

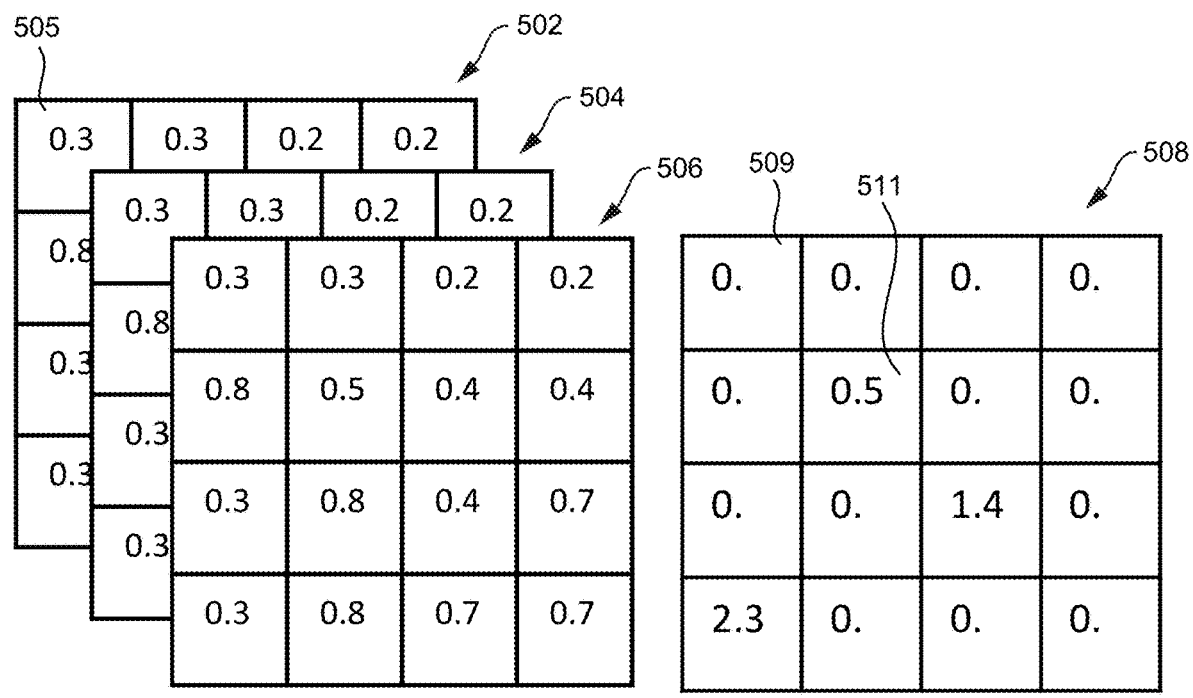
FIG. 5A
FIG. 5B
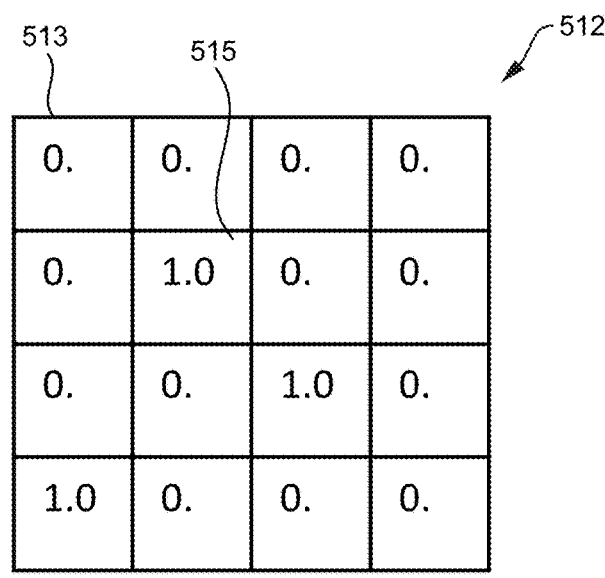
FIG. 5C

DEPTH ESTIMATION USING IMAGE AND SPARSE DEPTH INPUTS

CROSS-REFERENCE TO RELATED APPLICATIONS

This application claims the benefit of U.S. Provisional Application No. 63/418,837, filed Oct. 24, 2022, which is hereby incorporated by reference, in its entirety and for all purposes.

FIELD

The present disclosure generally relates to depth estimation from one or more images. For example, aspects of the present disclosure relate to systems and techniques for performing depth estimation using a machine learning system based on image and sparse depth inputs.

BACKGROUND

Machine learning models (e.g., deep learning models such as neural networks) can be used to perform a variety of tasks, including depth estimation, detection and/or recognition (e.g., scene or object detection and/or recognition), pose estimation, image reconstruction, classification, three-dimensional (3D) modeling, dense regression tasks, data compression and/or decompression, image processing, among other tasks. Machine learning models can be versatile and can achieve high quality results in a variety of tasks.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described herein for performing depth estimation using a machine learning system (e.g., a neural network system or model) based on image (e.g., one or more dense grayscale or color images) and sparse depth inputs. In some cases, the machine learning system can be trained using self-supervised learning.

According to at least one example, a method is provided for generating depth information from one or more images. The method can include: obtaining an image of a scene; obtaining depth information associated with one or more objects in the scene; processing, using an encoder of a neural network model, the image and the depth information to generate a feature representation of the image and the depth information; and processing, using a decoder of the neural network model, the feature representation of the image and the depth information to generate a depth output corresponding to the image.

In another example, an apparatus for generating depth information from one or more images is provided that includes at least one memory and at least one processor coupled to the at least one memory. The at least one processor can be configured to: obtain an image of a scene; obtain depth information associated with one or more objects in the scene; process, using an encoder of a neural network model, the image and the depth information to generate a feature representation of the image and the depth information; and process, using a decoder of the neural network model, the feature representation of the image and the depth information to generate a depth output corresponding to the image.

In another example, a non-transitory computer-readable medium is provided that has stored thereon instructions that, when executed by one or more processors, cause the one or more processors to: obtain an image of a scene; obtain depth information associated with one or more objects in the scene; process, using an encoder of a neural network model, the image and the depth information to generate a feature representation of the image and the depth information; and process, using a decoder of the neural network model, the feature representation of the image and the depth information to generate a depth output corresponding to the image.

In another example, an apparatus for generating depth information from one or more images is provided. The apparatus can include: means for obtaining an image of a scene; means for obtaining depth information associated with one or more objects in the scene; means for processing, using an encoder of a neural network model, the image and the depth information to generate a feature representation of the image and the depth information; and means for processing, using a decoder of the neural network model, the feature representation of the image and the depth information to generate a depth output corresponding to the image.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device or wireless communication device (e.g., a mobile telephone or other mobile device), a wearable device (e.g., a network-connected watch or other wearable device), a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof:

FIG. 5A is a diagram illustrating an example of color channels of an image that can be provided as input to the machine learning system of FIG. 3, in accordance with aspects of the present disclosure;

FIG. 5B is a diagram illustrating an example of a sparse depth map that can be provided as input to the machine learning system of FIG. 3, in accordance with aspects of the present disclosure;

FIG. 5C is a diagram illustrating an example of a validity map that can be provided as input to the machine learning system of FIG. 3, in accordance with aspects of the present disclosure;

DETAILED DESCRIPTION

Figure 1B:
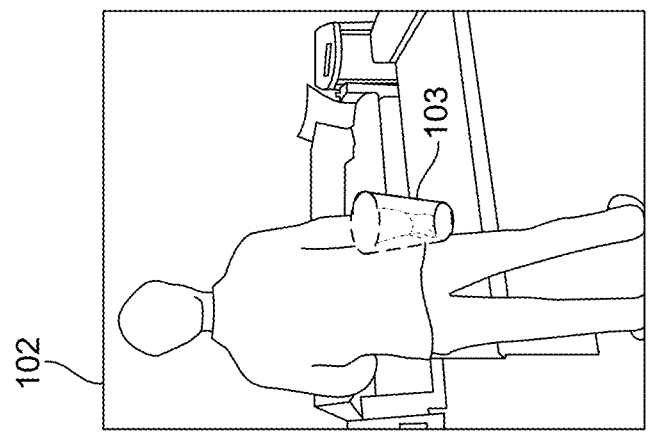
FIG. 1B is the image of the scene of FIG. 1A with virtual content added based on depth of the scene depicted in the image.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted above, machine learning systems (e.g., deep neural network systems or models) can be used to perform a variety of tasks such as, for example and without limitation, detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. Moreover, machine learning models can be versatile and can achieve high quality results in a variety of tasks.

In some cases, a machine learning system can perform depth prediction based on a single image (e.g., based on receiving a single image as input). Depth prediction based on a single input image can be referred to as monocular depth estimation. Monocular depth estimation can be used for many applications (e.g., XR applications, vehicle applications, etc.). In some cases, monocular depth estimation can be used to perform occlusion rendering, for example based on using depth and object segmentation information to render virtual objects in a 3D environment. In some cases, monocular depth prediction can be used to perform 3D reconstruction, for example based on using depth information and one or more poses to create a mesh of a scene. In some cases, monocular depth prediction can be used to perform collision avoidance, for example based on using depth information to estimate distance(s) to one or more objects.

Depth estimation (e.g., such as monocular depth estimation) can be used to generate three-dimensional content (e.g., such as XR content) with greater accuracy. For instance, monocular depth estimation can be used to generate XR content that combines a baseline image or video with one or more augmented overlays of rendered 3D objects. The baseline image data (e.g., an image or a frame of video) that is augmented or overlaid by an XR system may be a two-dimensional (2D) representation of a 3D scene. A naïve approach to generating XR content may be to overlay a rendered object onto the baseline image data, without compensating for 3D depth information that may be represented in the 2D baseline image data.

Figure 1A:
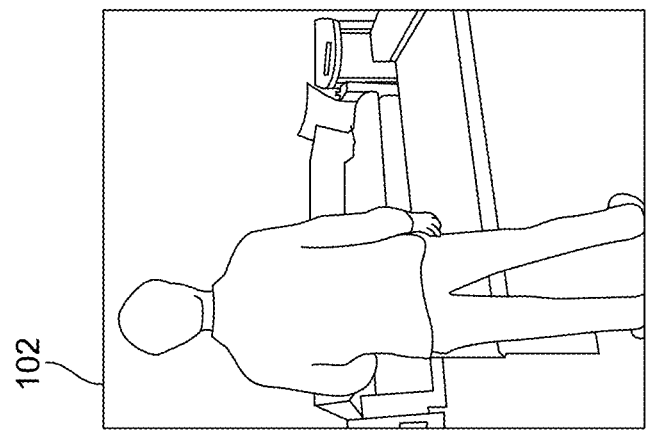
FIG. 1A is an image of a scene.

For example, FIG. 1A depicts an example image 102 of a scene including a first person in the foreground of the scene and a table behind the first person. The example image 102 of FIG. 1A may be utilized or otherwise provided as a 2D baseline image data that is to be augmented with one or more virtual object overlays. For example, the image 102 may be provided to an XR system as a baseline image data for generating rendered XR content.

For instance, FIG. 1B depicts an example image augmentation that may be performed based on using image 102 of FIG. 1A as the baseline image data. Here, the augmented frame can be generated as the baseline image 102 overlaid with an item of virtual content 103. For example, the item of virtual content 103 can be a rendered 3D object, a rendered 2D object, etc. As illustrated, the item of virtual content 103 is a drinking glass, which is overlaid on top of the baseline image 102 such that the item of virtual content 103 (e.g., the drinking glass) appears to sit on top of the table that is included in the foreground of the scene represented in the baseline image 102. As shown in FIG. 1B, a portion of the item of virtual content 103 blocks a portion of the first person (e.g., the person depicted in the example image 102) when the item of virtual content 103 is overlaid on top of the example image 102, whereas the portion of the item of virtual content 103 should be blocked by the portion of the first person (e.g., based on the first person being closer to the camera than the item of virtual content). Based on depth information of the scene depicted in the image, a machine learning system can perform occlusion rendering so that the portion of the item of virtual content 103 is rendered behind the portion of the first person.

Figure 1C:
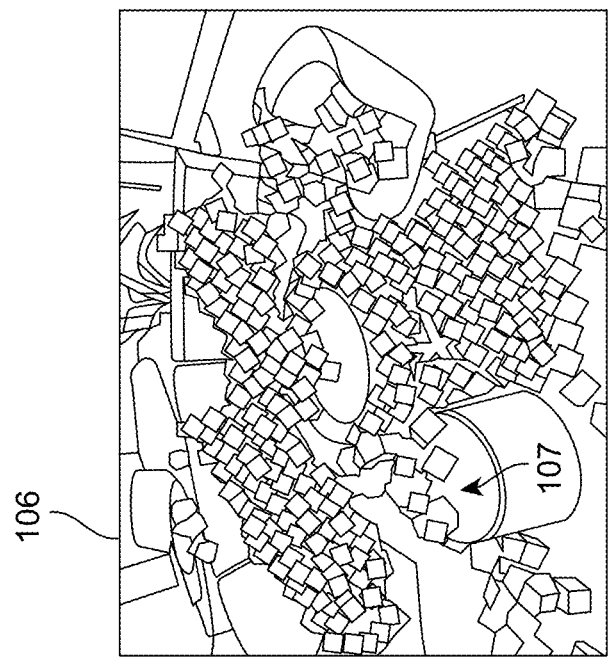
FIG. 1C is an example of an image with virtual content added based on depth of a scene depicted in the image.
Figure 1D:
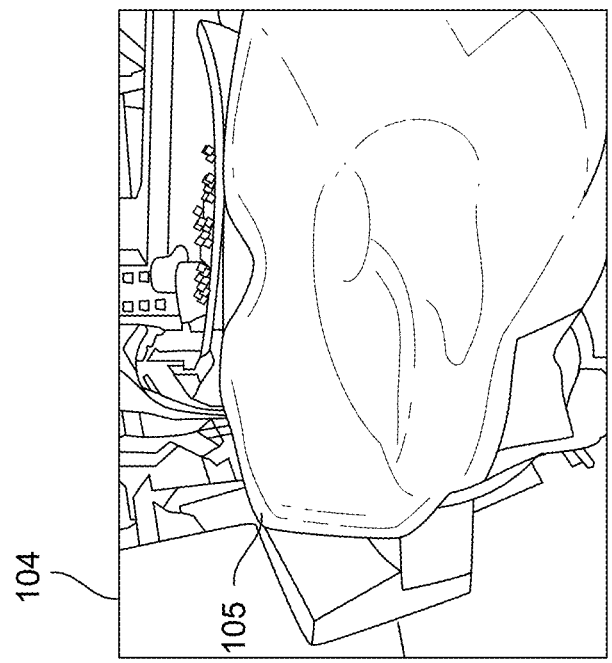
FIG. 1D is another example of an image with virtual content based on depth of a scene depicted in the image.

FIG. 1C is an example of an image 104 with a virtual blanket 105 added based on depth information of a scene depicted in the image 104. For example, the image 104 can be a frame of video data that is included in a plurality of frames of video data. As noted previously, depth information of the scene depicted in the image 104 can be used to generate XR content that combines a baseline image or video with one or more augmented overlays of rendered 3D objects. For example, depth information can be determined for some (or all) of the frames of video data of the plurality of frames of video data (e.g., including the image 104) and used by a machine learning system to perform occlusion rendering to accurately render the virtual blanket 105 added to the scene depicted in image 104. The depth information can be used to render the virtual blanket 105 in a constant and/or consistent location within the scene of example image 104 for different frames and different perspectives. For instance, as the perspective or point of view (POV) changes between frames of video data, the depth information can be used to render the virtual blanket 105 in the same relative position with respect to other foreground objects included in the scene depicted in image 104. FIG. 1D is an example of an image 106 with virtual blocks 107 added based on depth information of a scene depicted in the image 106. For example, the virtual blocks 107 can include a plurality of virtual blocks. Depth information can be determined for the image 106 (and/or can be determined for additional images included in the same video data or group of frames as image 106) and used to render the virtual blocks 107 in the scene depicted in the image 106. For example, depth information can be used to render physically accurate or realistic interactions between objects included in the scene of image 106 and respective ones of the virtual blocks 107. As noted previously, the depth information can be used to render the virtual blocks 107 in a constant and/or consistent position with respect to other foreground objects depicted in the scene of image 106.

Figure 2:
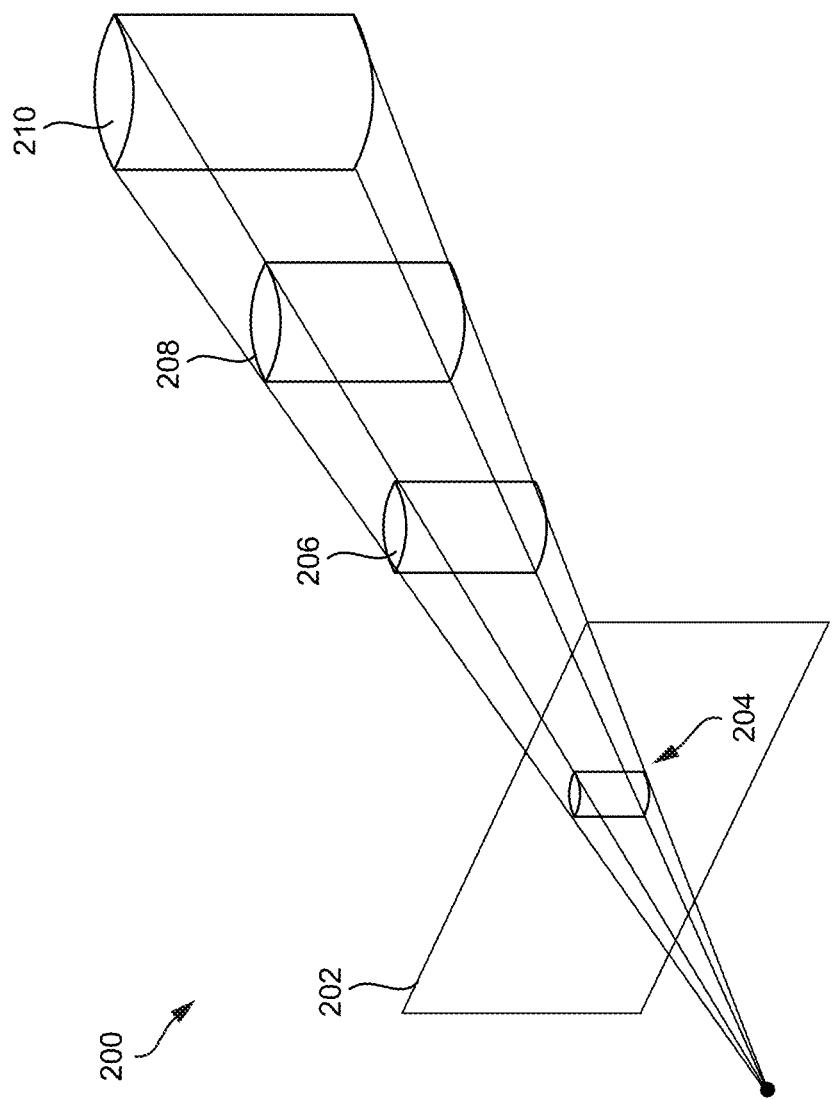
FIG. 2 is a diagram illustrating an example of depth scale ambiguity when determining depths from a single image, in accordance with aspects of the present disclosure.

In some examples, a machine learning system can perform monocular depth estimation to determine depth information associated with an image (e.g., image data or video data). Monocular depth estimation can be efficient, as monocular depth estimation can be performed based on receiving single images or frames as input. However, when generating monocular depth predictions (e.g., when performing monocular depth estimation), it can be difficult for a neural network to disambiguate a scale of the depth of one or more objects in a scene depicted in an image. For example, a first object may be associated with a first scale of depth and a second object may be associated with a second scale of depth that is different from the first scale of depth. Such an issue can be referred to as scale ambiguity or depth scale ambiguity for monocular depth estimation. FIG. 2 is a diagram 200 illustrating an example of such depth scale ambiguity when determining depths from a single image 202. As shown, the image 202 depicts a scene including an object 204. However, a neural network trained to predict a depth of the object 204 may have difficulty in determining the exact scale of the scene (and thus the object 204). For example, the representation of object 204 in image 202 can be associated with a first scale 206 having a first distance from the plane of image 202, can be associated with a second scale 208 having a second distance from the plane of image 202, and/or can be associated with a third scale 210 having a third distance from the plane of image 202. In the example of FIG. 2, depth scale ambiguity can occur based on an image including identical representations for a larger object at a greater distance from the imaging plane (e.g., plane of image 202) and a smaller object at a nearer distance from the image plane. A neural network trained to a predict a depth of the object 204 may have difficulty in determining the scale associated with the object 204 and its surrounding environment (e.g., the scene of image 202).

There is a need for systems and techniques that can be used to determine depth scale information associated with depth estimation. There is a further need for systems and techniques that can be used to determine depth scale information associated with monocular depth estimation (e.g., depth scale information associated with depth estimation based on a single image or frame) and/or can be used to disambiguate the scale of depth associated with a monocular depth estimation.

Systems, apparatuses, processes (also referred to as methods), and computer-readable media (collectively referred to as "systems and techniques") are described herein for performing depth estimation to predict depths for an image using a machine learning system (e.g., a neural network system or model) based on image and sparse depth inputs. For example, the systems and techniques described herein can use depth information including one or more sparse depth inputs to generate a feature representation of the image and the depth information. The generated feature representation can disambiguate the scale of depth associated with a depth output corresponding to the image (e.g., a depth estimation). The depth output corresponding to the image can be a monocular depth estimation.

In some examples, the sparse depth inputs can include sparse seed points associated with the depth information. For instance, the sparse depth inputs can be included in a sparse depth map comprising a plurality of locations that correspond to a respective plurality of locations in the input image associated with the depth estimation (e.g., monocular depth estimation). The sparse depth map can include a value representing a respective depth of a respective pixel at a corresponding location in the input image or can include a zero value indicating a lack of sparse depth information for a respective pixel at the corresponding location in the input image. In some cases, the sparse depth inputs (e.g., included in the sparse depth map) can be used by the systems and techniques to scale and/or re-scale one or more depth predictions associated with the input image. For example, the sparse depth map can be used to rescale one or more depth predictions of the depth output corresponding to the input image.

In one illustrative example, the sparse depth map can be provided as an input to an encoder of a machine learning network. For instance, the sparse depth map can be provided as input to an encoder of a neural network model used to generate the depth output corresponding to the image. Based on the sparse depth map being provided as input to the encoder of the neural network, scale information (e.g., associated with the sparse depth map) can be propagated to the output of the neural network (e.g., can be propagated to the depth output corresponding to the image), without performing a subsequent re-scaling of the depth predictions based on the sparse depth inputs.

In some aspects, the sparse depth inputs (e.g., included in the sparse depth map) can be fused with the input image. For example, the sparse depth inputs can be fused with one or more local features determined for the input image. In some cases, the sparse depth map and the input image can be provided as inputs to the same encoder of the neural network. In some aspects, the encoder of the neural network can include validity channel, which may also be referred to as a sparse validity channel. An input to the encoder of the neural network can include the input image of a scene and sparse depth information associated with the input image (e.g., a sparse depth map). In some examples, the input to the encoder of the neural network can additionally include validity information, such as a validity mask associated with the sparse depth map. In some aspects, the input to the encoder of the neural network can include the input image and the sparse depth map, and a validity mask associated with the sparse depth map can be generated based on validity information included in or indicated by the input.

Aspects of the systems and techniques described herein are described with respect to the figures.

Figure 3:
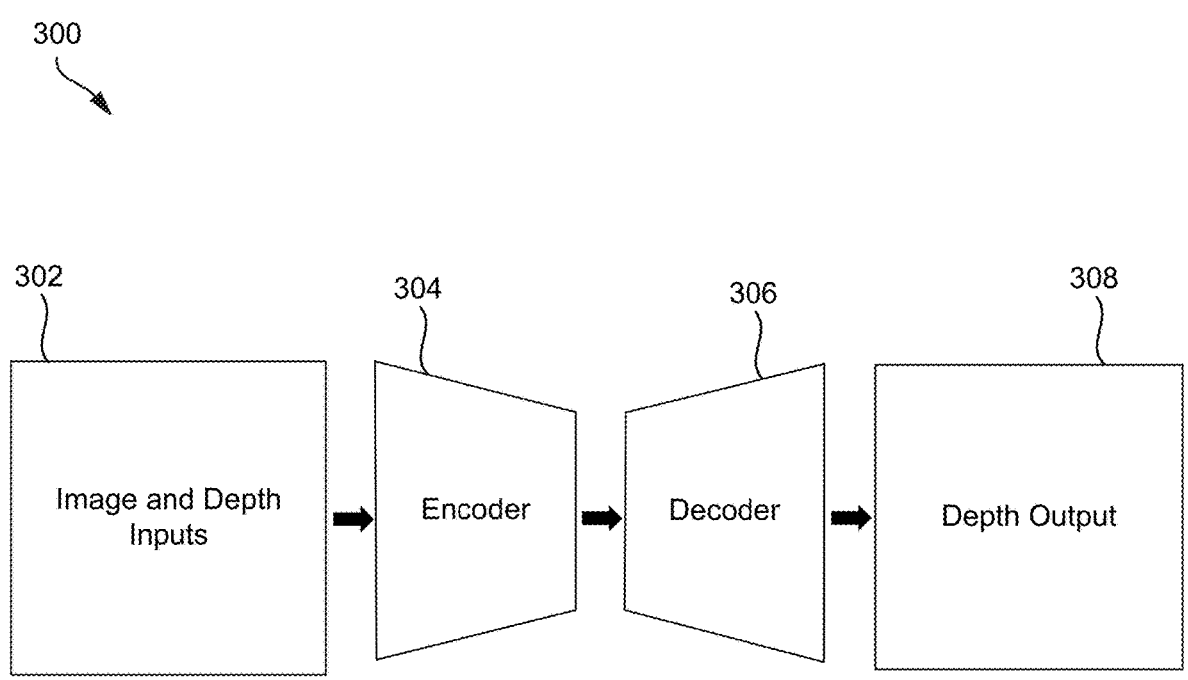
FIG. 3 is a diagram illustrating an example of a machine learning system configured to generate a depth output based on image and sparse depth inputs, in accordance with aspects of the present disclosure.

FIG. 3 is a diagram illustrating an example of a neural network system 300 configured to generate a depth output 308 based on image and depth inputs. For example, the neural network system 300 can generate depth output 308 based on one or more image and depth inputs 302. For instance, the image and depth inputs 302 can include one or more image inputs, one or more depth inputs, and/or a combination thereof. In some aspects, the image and depth inputs 302 may also be referred to herein as "inputs 302."

The neural network system 300 includes an encoder 304 and a decoder 306. The encoder 304 obtains the input 302, which includes image and depth inputs. In some cases, the input 302 can include additional inputs, such as a validity map (e.g., as described in more detail below). The encoder 304 can include one or more convolutional layers configured to determine features representing the input data. For example, encoder 304 can generate one or more feature representations of the image and depth information of the input 302. In some cases, the encoder 304 can include other additional layers, such as one or more normalization layers, activation layers (e.g., one or more rectified linear units (ReLUs)), pooling layers (e.g., one or more max-pooling layers), and/or other layers. In one illustrative example, the encoder 304 can be a ResNet encoder (e.g., a ResNet-34 encoder, a ResNet-18 encoder, etc.).

The features output by the encoder 304 (e.g., image and depth features representing the input 302) can be processed by the decoder 306 to generate or predict the depth output 308. For example, features generated by encoder 304 can be used by decoder 306 to generate or predict a depth output for an image included in the input 302. The depth output 308 can include one or more depth estimates or depth predictions for respective locations in the image included in input 302. For instance, depth output 308 can be a depth map including a depth estimate or prediction for some (or all) of the pixel locations in the image included in input 302. In some aspects, the decoder 306 can include one or more deconvolutional layers and in some cases other additional layers (e.g., one or more non-linear activation functions such as a rectified linear unit (ReLU), one or more pooling layers, etc.) configured to generate output features. The architecture of the decoder 306 can regress the output to a final value for the predicted depth output 308 (e.g., using a regression layer, which in some cases can compute a metric, such as a half-mean-squared-error loss, for the regression task of predicting the depth output 308). In some cases, the decoder 306 may include a final one or more layers (e.g., a fully connected layer, a softmax layer, a multilayer perceptron (MLP), and/or other layer) configured to generate or predict the depth output 308 for the image from the input 302. For instance, the final layer(s) may include a softmax layer that can perform a softmax function to transform the output of a fully-connected layer (e.g., represented as a vector of K elements) to a probability distribution (e.g., also represented as a vector of K elements that sum to 0). In one illustrative example, the encoder 302 and the decoder 304 can have a ResNet-UNet architecture (e.g., where the encoder 302 is a ResNet-34 encoder, a ResNet-18 encoder, or other type of ResNet encoder). In other aspects, the decoder 306 can include one or more transformer models or other neural network architecture (s).

Figure 4:
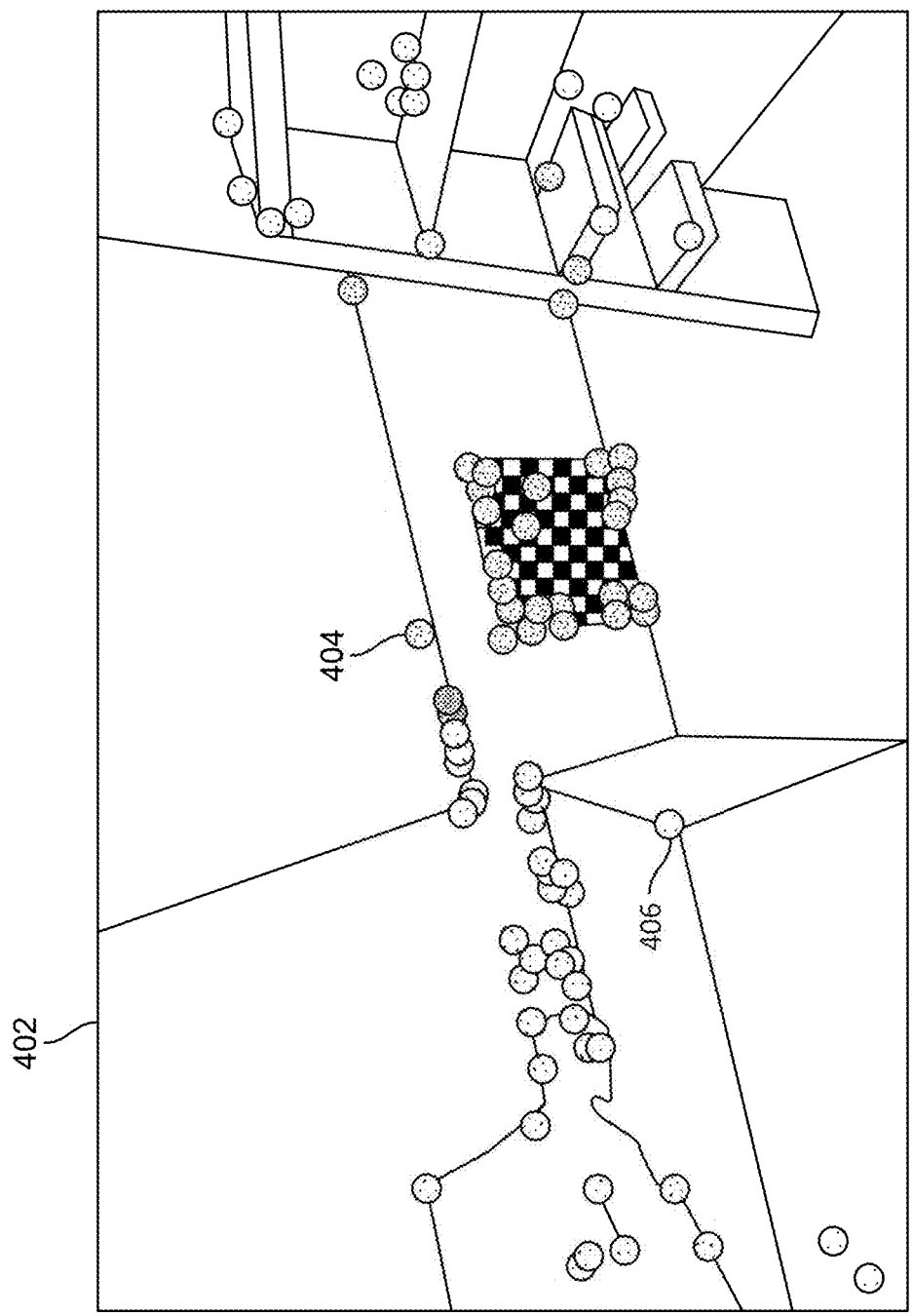
FIG. 4 is an example of an image with seed points projected to an image plane of the image, in accordance with aspects of the present disclosure.

The depth information of the input 302 includes a sparse depth input. For instance, the sparse depth input can be based on seed points, which can be used by the neural network system 300 to disambiguate the depth scale for the predicted depths for the image. FIG. 4 is an example of an image 402 with seed points projected to an image plane of the image 402. As shown, the seed points include a seed point 404 for a point where a floor meets a wall, a seed point 406 for a corner point on a table, among other seed points. Each respective seed point associated with an image (e.g., such as the seed points associated with image 402) can provide depth information of a point within the image. The seed points are sparse in the sense that points are not provided for every point in a scene. However, each of the seed points provide very accurate depth estimates. For example, the seed point 404 can include or be indicative of depth information for the point (e.g., within image 402) where the floor meets the wall, the seed point 406 can include or be indicative of depth information for the point (e.g., within image 402) representing the corner point on the table, etc.

The seed points can be provided from a system configured to generate or determine 6-degree-of-freedom (6-DOF) data representing a position and depth of one or more objects depicted in the image. In one example, the system can be a 6-DOF tracker. In some cases, the 6-DOF data can be obtained when performing simultaneous localization and mapping (SLAM). The 6DOF data can include three-dimensional rotational data (e.g., including pitch, roll, and yaw) and three-dimensional translation data (e.g., a horizontal displacement, a vertical displacement, and depth displacement relative to a reference point). In some examples, the three-dimensional rotational data can be with respect to a camera used to capture the image (e.g., including pitch, roll, and yaw of the camera when the image is captured). In some aspects, the seed points can include only the three-dimensional translation data for each point (e.g., the horizontal displacement, the vertical displacement, and the depth displacement of each point). In other aspects, the seed points can include the three-dimensional translation data and the three-dimensional rotational data.

Depth information can be used by the neural network system 300 to generate or predict the depth output 308 for the image from the input 302. In some aspects, depth information based on one or more seed points included in the image and depth input 302 can be used by the neural network system 300 to generate or predict the depth output 308 for the image from the input 302. For example, the seed points can be projected (e.g., based on a re-projection operation) to a two-dimensional image plane of the image of the input 302 to generate a depth map. In one illustrative example, sparse seed points (e.g., providing depth information for some, but not all, points in the scene of the image from input 302) can be projected to a 2D image plane of the image of input 302 to generate a sparse depth map.

Using the depth information based on the seed points noted above as input to the neural network model of the neural network system 300 can improve the accuracy of the neural network system 300. For instance, depth information associated with the seed points included in the input 302 can be used to propagate scale information through the neural network model of the neural network system 300. In some aspects, using the depth information based on the seed points of input 302 can also eliminate the need to perform rescaling (e.g., in view of the scale ambiguity for monocular depth estimation noted above). For instance, rescaling can be eliminated based on the neural network system 300 propagating the scale information (e.g., associated with the seed points of input 302) to the depth output 308. The use of the seed points included in input 302 may also the neural network model(s) of neural network system 300 to be implemented using a less complicated and/or a less computationally expensive network architecture (e.g., such as transformers), that would otherwise be effective in the absence of sparse seed points.

The image of the input 302 can be a grayscale image or a color image. The image can be considered a "dense" image, as each respective location (or pixel) in the image includes one or more values indicative of color information for the respective location or pixel (e.g., a red (R) value, a green (G) value, and a blue (B) value per pixel for color images, a grayscale value per pixel for grayscale images, etc.). FIG. 5A is a diagram illustrating an example of color channels 502, 504, and 506 of an image that can be provided as input to the neural network system 300 of FIG. 3. For instance, the color channels 502, 504, 506 can be associated with an RGB or other color image that is included in the input 302 to neural network system 300. Each pixel (or location) of the color channels 502, 504, and 506 corresponds to a color value for that pixel (or location). For instance, a pixel from an image can include a triplet of values between 0 and 255 (e.g., in an 8-bit representation) indicating a color for the pixel in the RGB color system, for example with (0, 0, 0) corresponding to black and (255, 255, 255) corresponding to white. Each pixel value can be normalized to a value between 0 and 1 to obtain the values for each pixel (or location) of the color channels 502, 504, and 506 shown in FIG. 5A.

FIG. 5B is a diagram illustrating an example of a depth map 508 that can be provided as input to the neural network system 300 of FIG. 3. For example, the depth map 508 can be included in the input 302 to neural network system 300. In some examples, the depth map 508 can be a sparse depth map. Each location or position in the depth map 508 corresponds to a pixel or location in the image of the input 302 (e.g., a pixel or location in the color channels 502, 504, and 506 shown in FIG. 5A). For example, a location 509 in the depth map 508 corresponds to a pixel or location 505 (e.g., a top-left location) in the color channel 502, and also corresponds to the top-left pixel or location in the color channels 504 and 506. As shown, the depth map 508 is sparse, in that it only includes depth information (or depth data) for certain pixels or locations of the image (e.g., the color channels 502, 504, and 506). For instance, the depth map 508 includes depth information (a value of 0.5, a value of 1.4, and a value of 2.3) for three corresponding pixels (or locations) in the color channels 502, 504, and 506. In some examples, one or more locations or positions in a sparse depth map (e.g., such as depth map 508) can be empty or otherwise do not include depth information. In some examples, the locations or positions in a sparse depth map (e.g., such as depth map 508) for which depth information is not included may have a value of 0.

As noted previously, in some cases, the input 302 can include validity data. For example, the input 302 can include a validity map indicative of the locations or positions in a sparse depth map that include depth information and/or indicative of the locations or positions in a sparse depth map that do not include depth information. FIG. 5C is a diagram illustrating an example of a validity map 512 that can be provided as part of the input 302 to the neural network system 300 of FIG. 3. The validity data (e.g., validity map 512) can be used to provide an extra validity channel for the input 302, and can be used (e.g., by the neural network system 300) to differentiate between valid depth information and invalid (or missing) values in the sparse depth map 508. For example, a value of 0 in the sparse depth map 508 may represent valid depth information (e.g., indicating a depth of 0) or may represent a missing value (e.g., indicating no depth information is provided for the respective position or location in the sparse depth map 508). In one illustrative example, the validity map 512 can be used to mitigate the issue of the neural network system 300 interpreting the 0s in the depth information (e.g., the 0s shown in the depth map 508 of FIG. 5B) as zero depths rather than missing values.

Each location or position in the validity map 512 corresponds to a location in the depth input (e.g., a location in the depth map 508 of FIG. 5A). For example, a location 513 in the validity map 512 corresponds to the location 509 (a top-left location) in the depth map 508. As shown, the validity map 512 includes either a value of 0 or a value of 1 for each location in the validity map 512. A value of 0 is generated for a location in the validity map 512 that corresponds to a location in the depth map 508 that does not include depth information. For instance, the location 513 in the validity map 512 includes a value of 0 based on the location 509 in the depth map 508 not including depth information (e.g., a depth value of 0). A value of 1 is generated for a location in the validity map 512 that corresponds to a location in the depth map 508 that includes depth information. For example, the location 515 in the validity map 512 includes a value of 1 based on the location 511 in the depth map 508 including depth information (e.g., a depth value of 0.5).

Figure 5D:
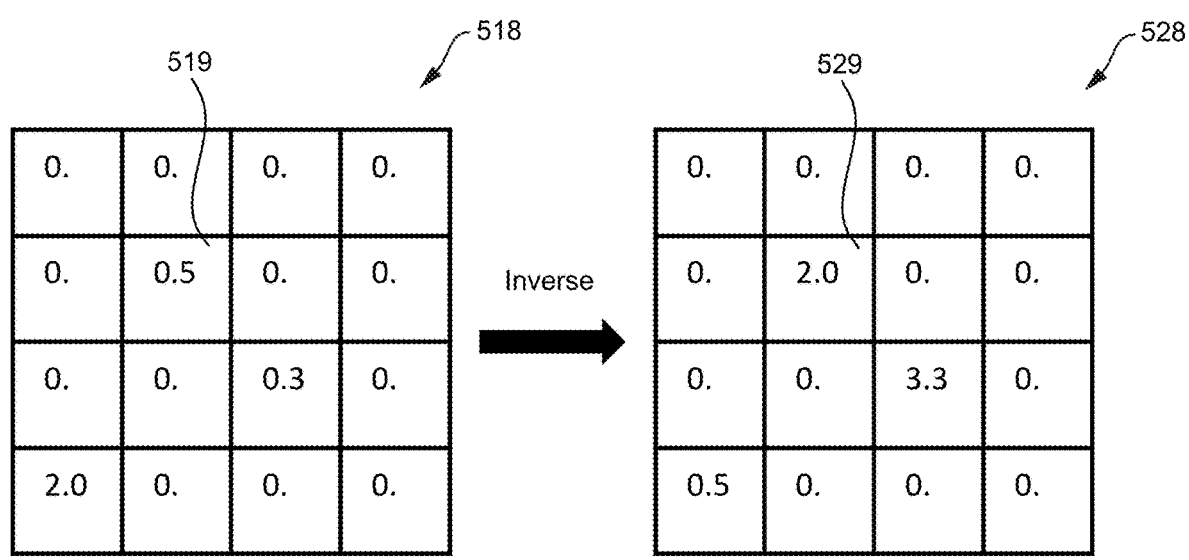
FIG. 5D is a diagram illustrating an example of a sparse inverse depth map that can be provided as input to the machine learning system of FIG. 3, in accordance with aspects of the present disclosure.

In some cases, the depth information can include inverse depth information based on an inverse of a depth value from the depth map (e.g., the depth map 508 of FIG. 5B). FIG. 5D is a diagram illustrating an example of a sparse inverse depth map 528 that can be generated based on a sparse depth map 518. Each location in the inverse sparse depth map 528 has a value that is an inverse of a corresponding value in a corresponding location of the sparse depth map 518. For example, the value of 0.5 for the location 519 of the sparse depth map 518 results in a value of 2.0 for the corresponding location 529 of the inverse sparse depth map 528. In some examples, the sparse inverse depth map 528 can be provided as part of the input 302 to the neural network system 300 of FIG. 3 instead of the sparse depth map (e.g., the sparse depth map 508) for numerical reasons. For instance, the neural network system 300 may predict a reciprocal of the actual depth values, in which case using the inverse of the depth information from the depth map (e.g., such as the inverse depth information of sparse inverse depth map 528) can result in more accurate results.

In one illustrative example, the input 302 to the neural network system 300 of FIG. 3 can include an RGB image having three color channels (e.g., including the color channel 502 which may be a red (R) color channel, the color channel 504 which may be a green (G) color channel, and the color channel 506 which may be a blue (B) color channel), a sparse depth map based on sparse seed points (e.g., the sparse depth map 508 of FIG. 5B), and a validity map (e.g., the validity map 512 of FIG. 5C). The values of the different inputs can be combined (e.g., concatenated) and then input to the neural network system 300.

In such an example, the input 302 has a shape or dimension of (B, 5, H, W), where B refers to a Batch size (e.g., a quantity of images in a batch of images used for each training iteration or epoch for which parameters such as weights of the neural network system 300 are updated during training); "5" refers to the quantity of channels of the input 302 (e.g., three channels for the 3 color channels of the input image, one channel for the depth map, and one channel for the validity map); H refers to the height of the inputs (e.g., which are all of the same resolution); and W refers to the width of the inputs. In some aspects, the height and width parameters (e.g., H and W, respectively) may be given in units of pixels.

The depth output 308 of the neural network system 300 includes a shape or dimension of (B, 1, H, W), where the single channel "1" corresponds to the depth output 308 including a single channel having the same dimension (H×W) as the RGB image, the sparse depth map, and the validity map of the input 302. For example, the depth output 308 can be a dense depth map with estimated depth values for each location of the sparse depth map included in the input 302 (e.g., with estimated depth values for each location of the image included in the input 302).

The RGB image can be denoted as $I_i \in \mathbb{R}^{3 \times H \times W}$. Given the RGB image $I_i$ with camera intrinsics K and pose $T_i$, a system including the neural network system 300 can project N given sparse 3D seed points $\{p^{(j)}|j \in \{0, \ldots N\}\}$ into the two-dimensional plane of the RGB image. Based on the projection of the N sparse 3D seed points, the system can generate or obtain $D_i \in \mathbb{R}^{H \times W}$ and $V_i \in \{0,1\}^{H \times W}$, representing the projected sparse inverse depths and validity masks respectively:

$$p'^{(j)} = (p'^{(j)}_x, p'^{(j)}_y, p'^{(j)}_z) = KT_i p^{(j)} | j \in \{0, \ldots N\}$$

$$p''^{(j)} = (p'^{(j)}_x/p'^{(j)}_z, p'^{(j)}_y/p'^{(j)}_z, p'^{(j)}_z)$$

$$D_i(p''^{(j)}_x, p''^{(j)}_y) = 1/p'^{(j)}_z | j \in \{0, \ldots, N\} \text{ and zero in other locations}$$

$$V_i(p''^{(j)}_x, p''^{(j)}_y) = 1 | j \in \{0, \ldots N\} \text{ and zero in other locations}$$

Here, $p'^{(j)}$ represents the projection of the j-th one of the N sparse 3D points $p^{(j)}$, wherein each $p'^{(j)}$ is a projected point in the image plane of the RGB image $I_i$ included in the input 302. $D_i(p''^{(j)}_x, p''^{(j)}_y)$ represents the sparse inverse depth points, and $V_i(p''^{(j)}_x, p''^{(j)}_y)$ represents the sparse validity mask.

In one illustrative example, the input to the neural network model of neural network system 300 (e.g., input 302) can be determined as $I_i @ D_i @ V_i$, where @ represents a channel-wise concatenation operation. For instance, the input 302 can be a channel-wise concatenation of the RGB input image $I_i$ with the inverse sparse depth map $D_i$ with the sparse validity mask $V_i$.

Based on the channel-wise concatenation of input 302, the systems and techniques described herein can ensure that the local features in $I_i$ are aligned with the corresponding sparse depth value $D_i$, with $V_i$ indicating if the sparse depth value is valid. The neural network system 300 can thus ensure that the mutually beneficial representations (e.g., the local appearance and the corresponding depth values, both from input 302) are aligned, fused, and processed together at the highest resolution and as early as possible.

In some cases, the neural network system 300 can be trained using self-supervised learning. For example, instead of using ground truth depth information (e.g., as a label and/or annotation associated with a training data input) to compute a loss and perform backpropagation through the network for training (e.g., which is performed for supervised learning techniques), the systems and techniques described herein can perform training based on relative pose information and depth information. For instance, the relative pose between two frames (e.g., two frames of training data) can be known. The two frames can be a source frame (e.g., RGB or grayscale source image) and a target frame (e.g., target image). Depth information (e.g., one or more depth estimates) may also be known for the source frame. In one illustrative example, using the relative pose and the depth information for the source image, the source image can be warped into the target image. The image can then be rendered in the target view, and the rendered view (in the target view) can be compared with the image observed at the target view (e.g., compared with the target frame) to determine the loss. The backpropagation can then be performed based on the loss.

The neural network system 300 of FIG. 3 provides benefits over other types of machine learning systems that predict depth for images (e.g., by performing monocular depth estimation). For instance, in one example neural network system, separate encoders can be used to process the image data and the sparse depth input, such as a first encoder for processing the image data and a second encoder (which can be referred to as a sparse encoder) for processing the sparse depth input. A shared decoder can receive an output of the first encoder and an output of the second encoder, and can determine a predicted depth. However, such a model assumes direct supervision (e.g., supervised learning), whereas the neural network of FIG. 3 trains in a fully self-supervised manner, as noted above. Further, the sparse depth input would be processed by an extra encoder (e.g., the sparse encoder), which reduces the spatial resolution of the depth-based features before fusing the depth-based features in the shared decoder. Such a neural network model architecture has several drawbacks, including segregation from RGB, where the model is less capable of associating local depth information to a pixel in the image (e.g., color or grayscale image) as the two inputs are processed in separate, independent encoder modules. In contrast to the two-encoder approach that fuses the image and depth values only on downsampled resolution after the encoders, the neural network 300 can ensure that the mutually beneficial representations (the local appearance and the corresponding depth values) are aligned, fused, and processed together at the highest resolution and as early as possible.

The two-encoder neural network model architecture is also more expensive than the neural network system 300 of FIG. 3, as it has higher computational and memory requirements due to the added parameters (e.g., weights, biases, etc.) in the sparse encoder. There is also a lack of a validity specification in such a neural network model architecture. For instance, the sparse depth information would be densely processed by the same set of network weights. This can deteriorate learning as numerically the 0s do not indicate zero depth but rather invalid/missing values while non-zero values denote pixel depth. The validity depth map described herein can solve such an issue.

Using the architecture of the neural network system 300 of FIG. 3 and the input information described with respect to FIG. 4 and FIG. 5A-FIG. 5D, the neural network system 300 can process and learn mutual information between the local image features and the depth information (e.g., based on the seed points). Furthermore, by processing the image and depth information early in the encoder 302 (at the input), the neural network system 300 ensures that high spatial resolution is maintained when fusing the depth information with the image (e.g., RGB) information. Furthermore, it allows there to be no confusion as to where the sparse point values are usable.

Such a solution also requires minimal computational requirements, as a lightweight neural network can be used due to the simple nature of the architecture needed to generate the features used for generating the depth output 308. For example, the proposed architecture is more lightweight than the two-encoder neural network model architecture noted above. For instance, as described above, the same encoder 304 is used for processing the image (e.g., color or grayscale images) and auxiliary sparse inputs (e.g., the sparse depth information), which solves the locality problem and reduces the computational and memory requirements. Furthermore, as noted above, a validity channel (e.g., a validity map) can also be provided as input to the neural network system 300. Adding the extra validity channel can mitigate the issue of interpreting the 0s as zero depths rather than missing values.

A system or device including or in communication with the neural network system 300 can perform one or more operations based on the depth output 308. For example, the system or device can use the depth output 308 to generate or render virtual content with the input image, perform detection and/or recognition (e.g., scene or object detection and/or recognition, face detection and/or recognition, etc.), perform pose estimation, perform image reconstruction, perform three-dimensional (3D) modeling, among other operations. The highly accurate depth predictions of the depth output 308 can improve such operations, such as improving qualities of reconstruction 3D meshes (e.g., walls and flat surfaces are less noisy, angles are more orthogonal, object boundaries are sharper, etc.).

Figure 6:
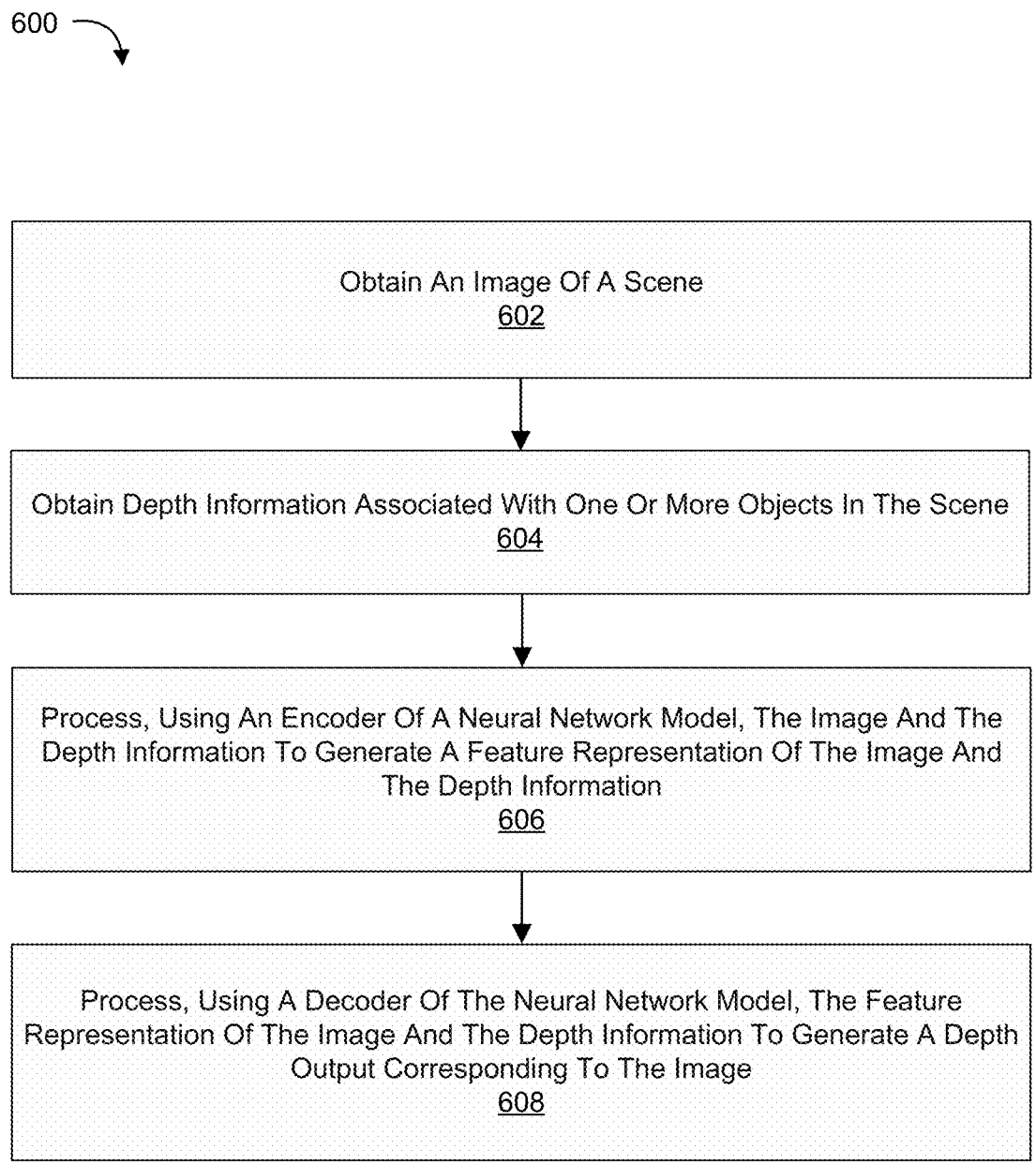
FIG. 6 is a flowchart illustrating an example process for generating depth information from one or more images, in accordance with aspects of the present disclosure.

FIG. 6 is a flowchart illustrating an example process 600 for generating depth information from one or more images using one or more of the techniques described herein. The process 600 can be performed by a computing device (or apparatus), or a component of the computing device (e.g., a chipset, a processor such as a neural processing unit (NPU), a digital signal processor (DSP), etc.), utilizing or implementing the neural network model (e.g., the neural network system 300 of FIG. 3).

At block 602, the computing device (or component thereof) can obtain an image of a scene (e.g., as part of the input 302 shown in FIG. 3). At block 604, the computing device (or component thereof) can obtain depth information (e.g., as part of the input 302 shown in FIG. 3) associated with one or more objects in the scene. The image can include a plurality of pixels having a resolution. In some aspects, the depth information can include a sparse depth map (e.g., the sparse depth map 508 of FIG. 5B) including a plurality of locations having the resolution, with each location of a first subset of locations of the plurality of locations in the sparse depth map including a value (e.g., value at location 511 in the sparse depth map 508 of FIG. 5B) representing a respective depth of a respective pixel having a corresponding location in the image, and each location of a second subset of locations of the plurality of locations in the sparse depth map including a zero value (e.g., the zero value at location 509 in the sparse depth map 508 of FIG. 5B) corresponding to a lack of depth information for a respective pixel having a corresponding location in the image (e.g., corresponding top-left location 505 in the in the color channel 502 and also the top-left locations in the color channels 504 and 506). Additionally or alternatively, the depth information can include a sparse depth map (e.g., sparse inverse depth map 528 of FIG. 5D) comprising a plurality of locations having the resolution, with each location of a first subset of locations of the plurality of locations in the sparse depth map including an inverse (e.g., the value of 2.0 for the location 529 of the inverse sparse depth map 528) of a value (e.g., the value 519 in the sparse depth map 518) representing a respective depth of a respective pixel having a corresponding location in the image, and each location of a second subset of locations of the plurality of locations in the sparse depth map including a zero value corresponding to a lack of depth information for a respective pixel having a corresponding location in the image.

In some aspects, the computing device (or component thereof) can obtain a validity map (e.g., the validity map 512 of FIG. 5C) having the resolution. Each location in the validity map including a first value (e.g., a value of 1, such as the value of 1 at the location 515 of the validity map 512 of FIG. 5C) representing whether a corresponding location in the sparse depth map includes a valid depth value or a second value (e.g., a value of 0, such as the value of 0 at the location 513 of the validity map 512 of FIG. 5C) representing whether a corresponding location in the sparse depth map includes a zero value. In such aspects, the computing device (or component thereof) can process, using the encoder of a neural network model, the image, the depth information, and the validity map to generate the feature representation. In such aspects, the feature representation represents the image, the depth information, and the validity map.

At block 606, the computing device (or component thereof) can process, using an encoder of a neural network model (e.g., the encoder 304 of the neural network system 300 of FIG. 3), the image and the depth information to generate a feature representation of the image and the depth information. For example, the computing device (or component thereof) can generate a channel-wise concatenation of the image, the depth information, and the validity map. Based on generating the validity map, an encoder of a neural network model (e.g., the encoder 304 of the neural network system 300 of FIG. 3) can be used to generate the feature representation of the image and the depth information based on the channel-wise concatenation. In some cases, the channel-wise concatenation can include one or more color channels of the image, a depth channel associated with the sparse depth map, and a validity channel associated with the validity map. The feature representation generated by the encoder of the neural network model (e.g., the feature representation generated by encoder 304 of FIG. 3) using the channel-wise concatenation can include a plurality of features having the resolution (e.g., the same resolution as the channel-wise concatenation and/or the same resolution as the image, the sparse depth map, and/or the validity map).

For instance, an input to the encoder of the neural network model can be the same as or similar to the input 302 of FIG. 3. In some cases, the input to the encoder of the neural network model can include an RGB image having three color channels (e.g., such as the red (R) color channel 502 of FIG. 5A, the green (G) color channel 504 of FIG. 5A, and the blue (B) color channel 506 of FIG. 5A). The input to the encoder of the neural network model can include a sparse depth map based on one or more sparse seed points. For example, the input to the encoder of the neural network model can include the sparse depth map 508 of FIG. 5B. In some cases, the input to the encoder of the neural network model can include a validity map, such as the validity map 512 of FIG. 5C. As noted above, the computing device (or component thereof) can generate a channel-wise concatenation of the image information, the depth information, and the validity map. For instance, the values of the RGB color channel inputs, the values of the sparse depth map (and/or sparse depth map seed points), and/or the values of the validity map can be combined in a channel-wise concatenation to generate an input to the encoder of the neural network model.

In some cases, the channel-wise concatenation of the image, the depth information, and the validity map can be generated as $I_i@D_i@V_i$, where @ represents a channel-wise concatenation operation. For instance, the input to the encoder of the neural network model (e.g., encoder 304 of FIG. 3) can be a channel-wise concatenation of an RGB input image $I_i$ with an inverse sparse depth map $D_i$ with a sparse validity mask $V_i$. In some examples, the channel-wise concatenation can be used to ensure that local features in the image (e.g., the RGB input image $I_i$) are aligned with the corresponding sparse depth value in $D_i$, with the validity map $V_i$ indicating if a respective sparse depth value is valid or invalid.

At block 608, the computing device (or component thereof) can process, using a decoder of the neural network model (e.g., the decoder 306 of the neural network system 300 of FIG. 3), the feature representation of the image and the depth information to generate a depth output corresponding to the image (e.g., the depth output 308 of FIG. 3). For instance, the depth output can include a depth map having the resolution. Each location in the depth map can include a value representing a respective depth of a respective pixel having a corresponding location in the image (e.g., a top-left location in the depth map includes a depth value indicating a depth for a top-left pixel in the image). In some aspects, the computing device (or component thereof) can process the depth output to generate a 3-dimensional mesh of the scene depicted in the image or to perform on or more other operations or functions.

In some aspects, the computing device (or component thereof) can obtain a plurality of seed points. For instance, each seed point of the plurality of seed points can indicate a respective position and depth of a respective point in the scene. In such aspects, the computing device (or component thereof) can generate the depth information based on the plurality of seed points. For instance, to generate the depth information based on the plurality of seed points, the computing device (or component thereof) can project the plurality of seed points to a two-dimensional image plane associated with the image.

As noted above, the processes described herein (e.g., process 600 and/or any other process described herein) may be performed by a computing device or apparatus utilizing or implementing the neural network model (e.g., the neural network system 300 of FIG. 3). In one example, the process 600 can be performed by the electronic device 100 of FIG. 1. In another example, the process 600 can be performed by the computing system having the computing device architecture of the computing system 900 shown in FIG. 9 utilizing or implementing the neural network model (e.g., the neural network system 300 of FIG. 3). For instance, a computing device with the computing device architecture of the computing system 900 shown in FIG. 9 can implement the operations of FIG. 6 and/or the components and/or operations described herein with respect to any of FIGS. 3 through 5D (e.g., the neural network system 300 of FIG. 3).

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
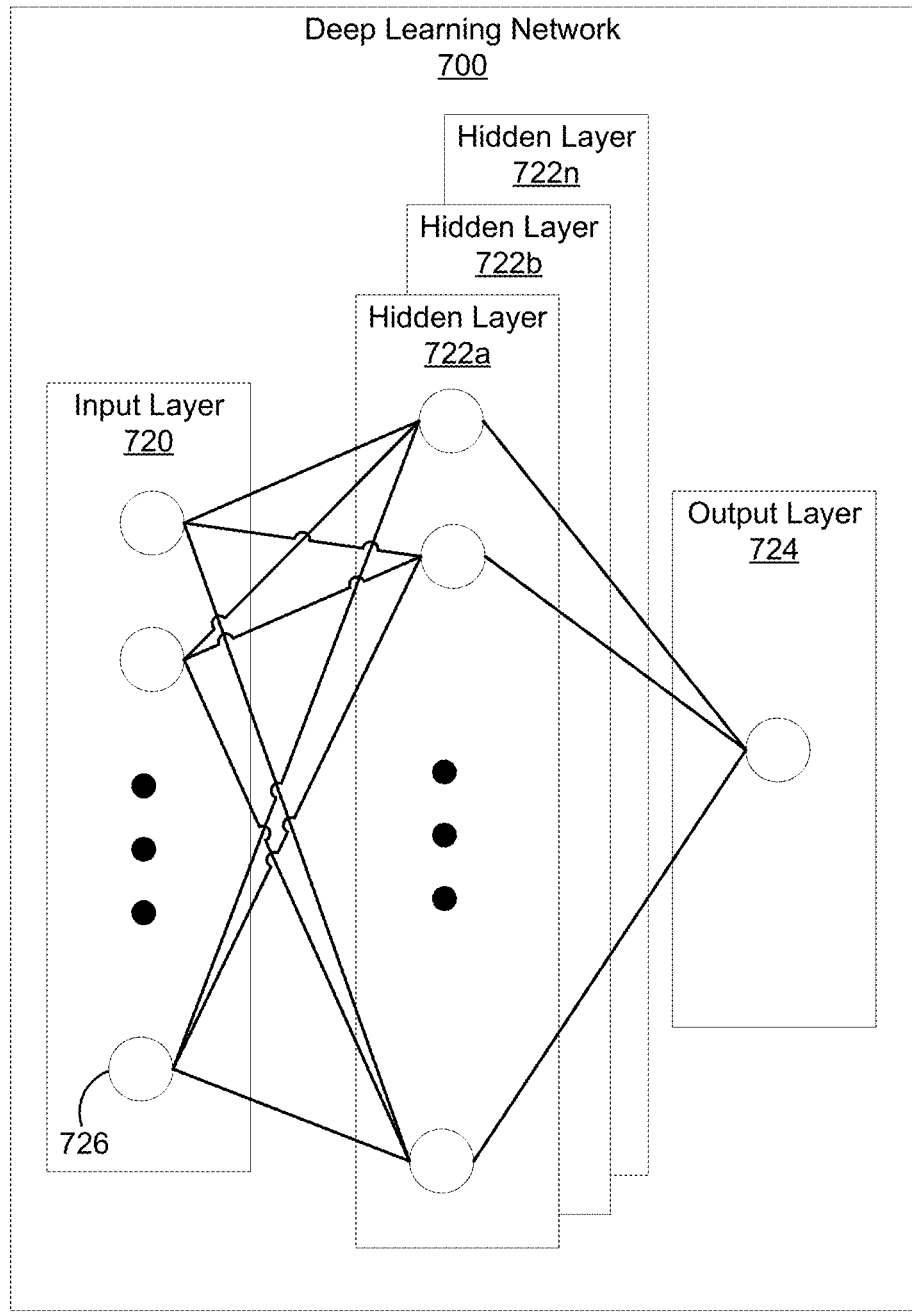
FIG. 7 is a block diagram illustrating an example of a deep learning network, in accordance with some examples.

As described herein, the neural network system 300 of FIG. 3 may be implemented using a neural network or multiple neural networks. FIG. 7 is an illustrative example of a deep learning neural network 700 that can be used by the neural network system 300 of FIG. 3. An input layer 720 includes input data. In one illustrative example, the input layer 720 can include data representing the pixels of an input video frame. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include as many layers as needed for the given application. The neural network 700 further includes an output layer 724 that provides an output resulting from the processing performed by the hidden layers 722a, 722b, through 722n. In one illustrative example, the output layer 724 can provide a classification for an object in an input video frame. The classification can include a class identifying the type of object (e.g., a person, a dog, a cat, or other object).

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the hidden layers 722a, 722b, through 722n can transform the information of each input node by applying activation functions to the information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 724, at which an output is provided. In some cases, while nodes (e.g., node 726) in the neural network 700 are shown as having multiple output lines, a node has a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 724. In an example in which the neural network 700 is used to identify objects in images, the neural network 700 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 700 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 700 is trained well enough so that the weights of the layers are accurately tuned.

For the example of identifying objects in images, the forward pass can include passing a training image through the neural network 700. The weights are initially randomized before the neural network 700 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 700, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 700 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma \frac{1}{2}(\text{target}-\text{output})^2$, which calculates the sum of one-half times a ground truth output (e.g., the actual answer) minus the predicted output (e.g., the predicted answer) squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 700 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

In some cases, the neural network 700 can be trained using self-supervised learning, as described above with respect to the neural network system of FIG. 3.

The neural network 700 can include any suitable deep network. One example includes a convolutional neural network (CNN), which includes an input layer and an output layer, with multiple hidden layers between the input and out layers. An example of a CNN is described below with respect to FIG. 8. The hidden layers of a CNN include a series of convolutional, nonlinear, pooling (for downsampling), and fully connected layers. The neural network 700 can include any other deep network other than a CNN, such as an autoencoder, a deep belief nets (DBNs), a Recurrent Neural Networks (RNNs), among others.

Figure 8:
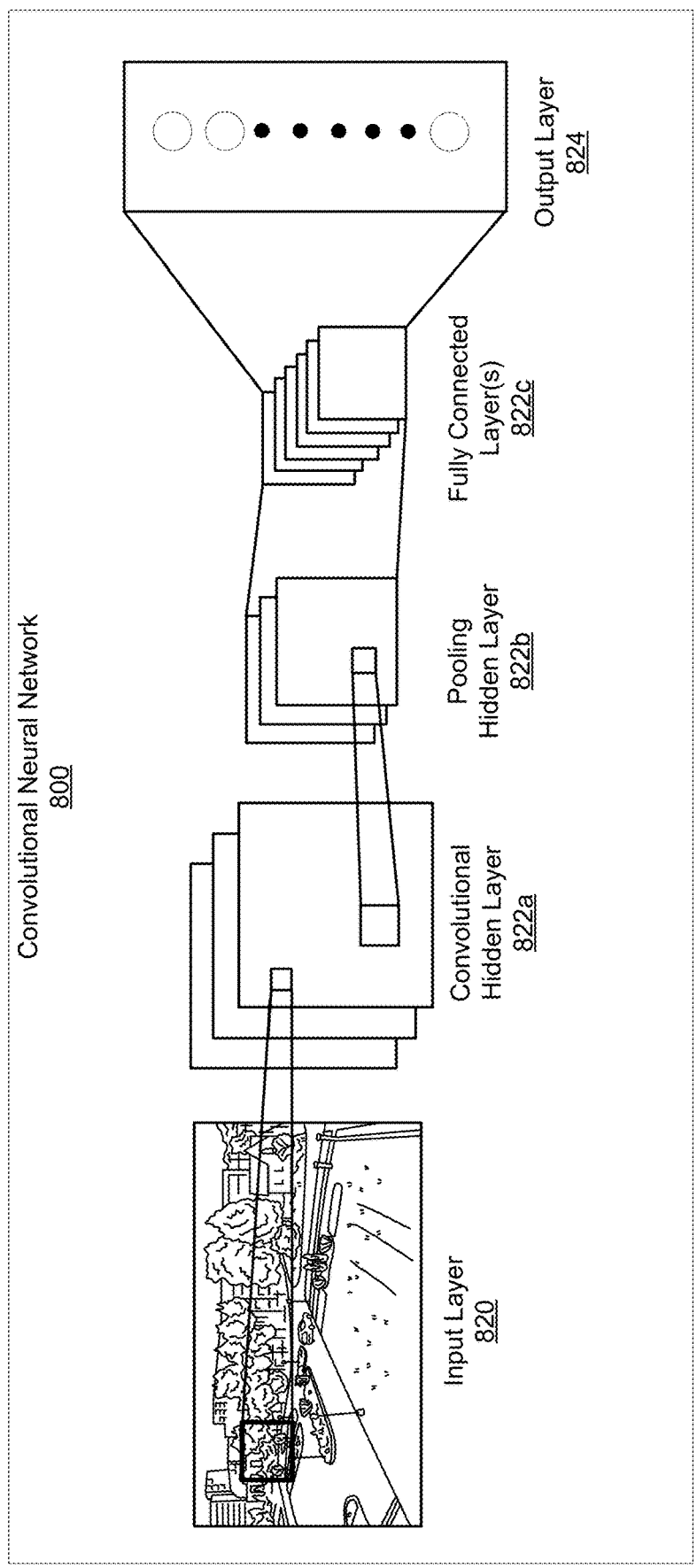
FIG. 8 is a block diagram illustrating an example of a convolutional neural network, in accordance with some examples.

FIG. 8 is an illustrative example of a convolutional neural network 800 (CNN 800). The input layer 820 of the CNN 800 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 822a, an optional non-linear activation layer, a pooling hidden layer 822b, and fully connected hidden layers 822c to get an output at the output layer 824. While only one of each hidden layer is shown in FIG. 8, one of ordinary skill will appreciate that multiple convolutional hidden layers, non-linear layers, pooling hidden layers, and/or fully connected layers can be included in the CNN 800. As previously described, the output can indicate a single class of an object or can include a probability of classes that best describe the object in the image.

The first layer of the CNN 800 is the convolutional hidden layer 822a. The convolutional hidden layer 822a analyzes the image data of the input layer 820. Each node of the convolutional hidden layer 822a is connected to a region of nodes (pixels) of the input image called a receptive field. The convolutional hidden layer 822a can be considered as one or more filters (each filter corresponding to a different activation or feature map), with each convolutional iteration of a filter being a node or neuron of the convolutional hidden layer 822a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 822a. Each connection between a node and a receptive field for that node learns a weight and, in some cases, an overall bias such that each node learns to analyze its particular local receptive field in the input image. Each node of the hidden layer 822a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 822a is due to each node of the convolutional layer being applied to its corresponding receptive field. For example, a filter of the convolutional hidden layer 822a can begin in the top-left corner of the input image array and can convolve around the input image. As noted above, each convolutional iteration of the filter can be considered a node or neuron of the convolutional hidden layer 822a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 822a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 822a.

The mapping from the input layer to the convolutional hidden layer 822a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 822a can include several activation maps in order to identify multiple features in an image. The example shown in FIG. 8 includes three activation maps. Using three activation maps, the convolutional hidden layer 822a can detect three different kinds of features, with each feature being detectable across the entire image.

In some examples, a non-linear hidden layer can be applied after the convolutional hidden layer 822a. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 800 without affecting the receptive fields of the convolutional hidden layer 822a.

The pooling hidden layer 822b can be applied after the convolutional hidden layer 822a (and after the non-linear hidden layer when used). The pooling hidden layer 822b is used to simplify the information in the output from the convolutional hidden layer 822a. For example, the pooling hidden layer 822*b* can take each activation map output from the convolutional hidden layer 822*a* and generates a condensed activation map (or feature map) using a pooling function. Max-pooling is one example of a function performed by a pooling hidden layer. Other forms of pooling functions be used by the pooling hidden layer 822*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 822*a*. In the example shown in FIG. 8, three pooling filters are used for the three activation maps in the convolutional hidden layer 822*a*.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 822*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 822*a* having a dimension of 24×24 nodes, the output from the pooling hidden layer 822*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 800.

The final layer of connections in the network is a fully-connected layer that connects every node from the pooling hidden layer 822*b* to every one of the output nodes in the output layer 824. Using the example above, the input layer includes 28×28 nodes encoding the pixel intensities of the input image, the convolutional hidden layer 822*a* includes 3×24×24 hidden feature nodes based on application of a 5×5 local receptive field (for the filters) to three activation maps, and the pooling layer 822*b* includes a layer of 3×12×12 hidden feature nodes based on application of max-pooling filter to 2×2 regions across each of the three feature maps. Extending this example, the output layer 824 can include ten output nodes. In such an example, every node of the 3×12×12 pooling hidden layer 822*b* is connected to every node of the output layer 824.

The fully connected layer 822*c* can obtain the output of the previous pooling layer 822*b* (which should represent the activation maps of high-level features) and determines the features that most correlate to a particular class. For example, the fully connected layer 822*c* layer can determine the high-level features that most strongly correlate to a particular class, and can include weights (nodes) for the high-level features. A product can be computed between the weights of the fully connected layer 822*c* and the pooling hidden layer 822*b* to obtain probabilities for the different classes. For example, if the CNN 800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 824 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 9:
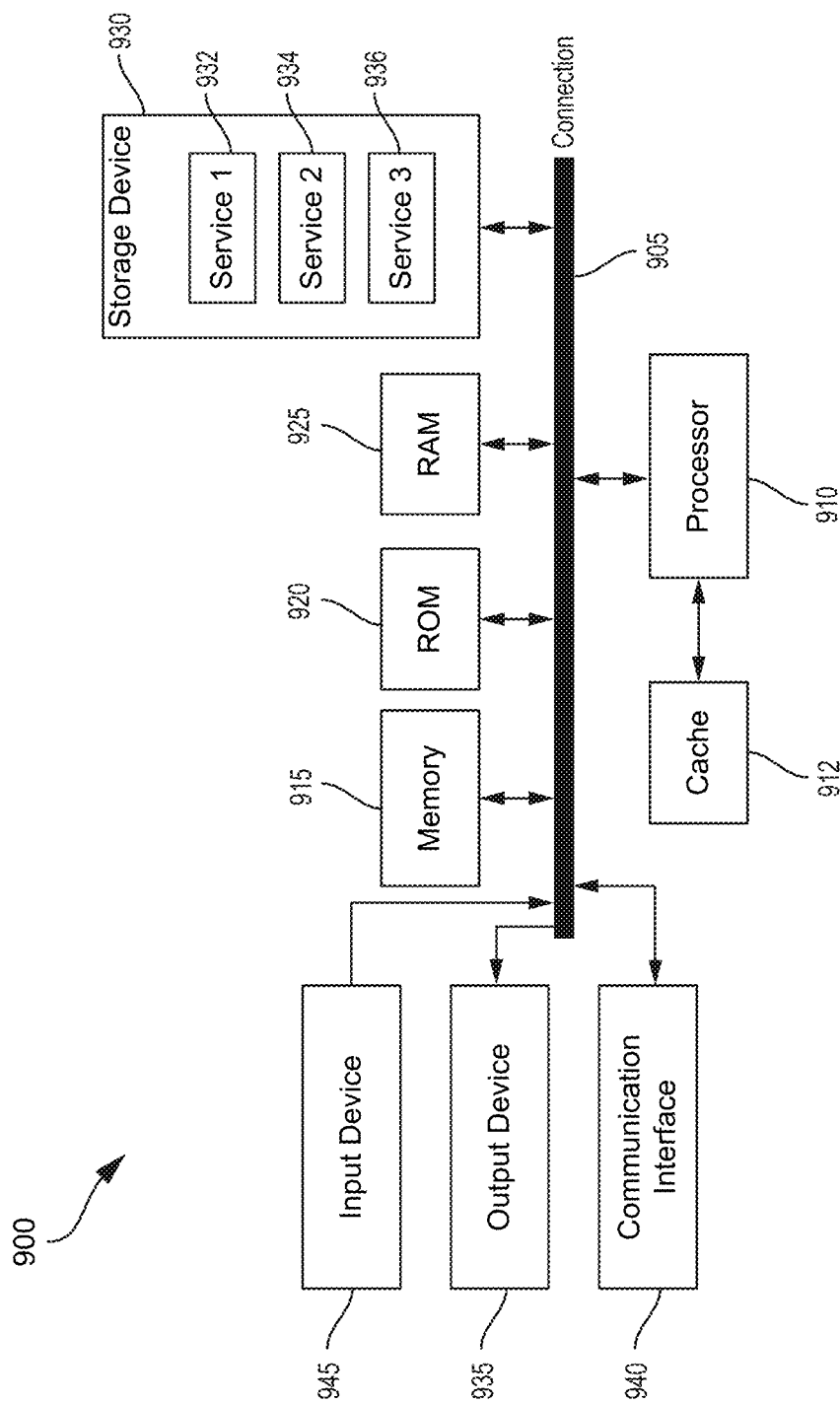
FIG. 9 is a diagram illustrating an example system architecture for implementing certain aspects described herein.

FIG. 9 is a diagram illustrating an example of a system for implementing certain aspects of the present disclosure. In particular, FIG. 9 illustrates an example of computing system 900, which can be for example any computing device making up a computing system, a camera system, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some examples, computing system 900 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some examples, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual aspects and examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus for generating depth information from one or more images, the apparatus comprising: at least one memory; and at least one processor coupled to the at least one memory, the at least one processor being configured to: obtain an image of a scene; obtain depth information associated with one or more objects in the scene; process, using an encoder of a neural network model, the image and the depth information to generate a feature representation of the image and the depth information; and process, using a decoder of the neural network model, the feature representation of the image and the depth information to generate a depth output corresponding to the image.

Aspect 2. The apparatus of Aspect 1, wherein the image includes a plurality of pixels having a resolution.

Aspect 3. The apparatus of Aspect 2, wherein the depth information includes a sparse depth map comprising a plurality of locations having the resolution, and wherein: each location of a first subset of locations of the plurality of locations in the sparse depth map includes a value representing a respective depth of a respective pixel having a corresponding location in the image; and each location of a second subset of locations of the plurality of locations in the sparse depth map includes a zero value corresponding to a lack of depth information for a respective pixel having a corresponding location in the image.

Aspect 4. The apparatus of any of Aspects 2 to 3, wherein the depth information includes a sparse depth map comprising a plurality of locations having the resolution, and wherein: each location of a first subset of locations of the plurality of locations in the sparse depth map includes an inverse of a value representing a respective depth of a respective pixel having a corresponding location in the image; and each location of a second subset of locations of the plurality of locations in the sparse depth map includes a zero value corresponding to a lack of depth information for a respective pixel having a corresponding location in the image.

Aspect 5. The apparatus of any of Aspects 3 to 4, wherein the at least one processor is configured to: obtain a validity map having the resolution, each location of a plurality of locations in the validity map including a respective first value indicating a corresponding location in the sparse depth map includes a valid depth value or including a respective second value indicating the corresponding location in the sparse depth map includes a zero value; and process, using the encoder of the neural network model, the image, the depth information, and the validity map to generate the feature representation, wherein the feature representation represents the image, the depth information, and the validity map.

Aspect 6. The apparatus of Aspect 5, wherein the at least one processor is configured to: generate a channel-wise concatenation of the image, the depth information, and the validity map; and process, using the encoder of the neural network model, the channel-wise concatenation to generate the feature representation.

Aspect 7. The apparatus of Aspect 6, wherein: the channel-wise concatenation includes one or more color channels of the image, a depth channel associated with the sparse depth map, and a validity channel associated with the validity map; and the feature representation includes a plurality of features having the resolution.

Aspect 8. The apparatus of any of Aspects 2 to 7, wherein the depth output includes a depth map having the resolution, each location in the depth map including a value representing a respective depth of a respective pixel having a corresponding location in the image.

Aspect 9. The apparatus of any of Aspects 1 to 8, wherein the at least one processor is configured to: process the depth output to generate a 3-dimensional mesh of the scene.

Aspect 10. The apparatus of any of Aspects 1 to 9, wherein the at least one processor is configured to: obtain a plurality of seed points, each seed point of the plurality of seed points indicating a respective position and depth of a respective point in the scene; and generate the depth information based on the plurality of seed points.

Aspect 11. The apparatus of Aspect 10, wherein, to generate the depth information based on the plurality of seed points, the at least one processor is configured to: project the plurality of seed points to a two-dimensional image plane associated with the image.

Aspect 12. A method of generating depth information from one or more images, the method comprising: obtaining an image of a scene; obtaining depth information associated with one or more objects in the scene; processing, using an encoder of a neural network model, the image and the depth information to generate a feature representation of the image and the depth information; and processing, using a decoder of the neural network model, the feature representation of the image and the depth information to generate a depth output corresponding to the image.

Aspect 13. The method of Aspect 12, wherein the image includes a plurality of pixels having a resolution.

Aspect 14. The method of Aspect 13, wherein the depth information includes a sparse depth map comprising a plurality of locations having the resolution, and wherein: each location of a first subset of locations of the plurality of locations in the sparse depth map includes a value representing a respective depth of a respective pixel having a corresponding location in the image; and each location of a second subset of locations of the plurality of locations in the sparse depth map includes a zero value corresponding to a lack of depth information for a respective pixel having a corresponding location in the image.

Aspect 15. The method of any of Aspects 13 to 14, wherein the depth information includes a sparse depth map comprising a plurality of locations having the resolution, and wherein: each location of a first subset of locations of the plurality of locations in the sparse depth map includes an inverse of a value representing a respective depth of a respective pixel having a corresponding location in the image; and each location of a second subset of locations of the plurality of locations in the sparse depth map includes a zero value corresponding to a lack of depth information for a respective pixel having a corresponding location in the image.

Aspect 16. The method of any of Aspects 14 to 15, further comprising: obtaining a validity map having the resolution, each location of a plurality of locations in the validity map including a respective first value indicating a corresponding location in the sparse depth map includes a valid depth value or including a respective second value indicating the corresponding location in the sparse depth map includes a zero value; and processing, using the encoder of the neural network model, the image, the depth information, and the validity map to generate the feature representation, wherein the feature representation represents the image, the depth information, and the validity map.

Aspect 17. The method of Aspect 16, further comprising: generating a channel-wise concatenation of the image, the depth information, and the validity map; and processing, using the encoder of the neural network model, the channel-wise concatenation to generate the feature representation.

Aspect 18. The method of Aspect 17, wherein: the channel-wise concatenation includes one or more color channels of the image, a depth channel associated with the sparse depth map, and a validity channel associated with the validity map; and the feature representation includes a plurality of features having the resolution.

Aspect 19. The method of any of Aspects 13 to 18, wherein the depth output includes a depth map having the resolution, each location in the depth map including a value representing a respective depth of a respective pixel having a corresponding location in the image.

Aspect 20. The method of any of Aspects 12 to 19, further comprising: processing the depth output to generate a 3-dimensional mesh of the scene.

Aspect 21. The method of any of Aspects 12 to 20, further comprising: obtaining a plurality of seed points, each seed point of the plurality of seed points indicating a respective position and depth of a respective point in the scene; and generating the depth information based on the plurality of seed points.

Aspect 22. The method of Aspect 21, wherein generating the depth information based on the plurality of seed points comprises: projecting the plurality of seed points to a two-dimensional image plane associated with the image.

Aspect 23. A non-transitory computer-readable medium having stored thereon instructions which, when executed by one or more processors, cause the one or more processors to perform operations comprising: obtaining an image of a scene; obtaining depth information associated with one or more objects in the scene; processing, using an encoder of a neural network model, the image and the depth information to generate a feature representation of the image and the depth information; and processing, using a decoder of the neural network model, the feature representation of the image and the depth information to generate a depth output corresponding to the image.

Aspect 24. The non-transitory computer-readable medium of Aspect 23, wherein the image includes a plurality of pixels having a resolution.

Aspect 25. The non-transitory computer-readable medium of Aspect 24, wherein the depth information includes a sparse depth map comprising a plurality of locations having the resolution, and wherein: each location of a first subset of locations of the plurality of locations in the sparse depth map includes a value representing a respective depth of a respective pixel having a corresponding location in the image; and each location of a second subset of locations of the plurality of locations in the sparse depth map includes a zero value corresponding to a lack of depth information for a respective pixel having a corresponding location in the image.

Aspect 26. The non-transitory computer-readable medium of Aspect 25, wherein the sparse depth map is an inverse sparse depth map, and wherein each location of the first subset of locations includes an inverse of the respective depth of the respective pixel having the corresponding location in the image.

Aspect 27. The non-transitory computer-readable medium of any of Aspects 25 to 26, wherein the instructions further cause the one or more processors to perform operations comprising: obtaining a validity map having the resolution, each location of a plurality of locations in the validity map including a respective first value indicating a corresponding location in the sparse depth map includes a valid depth value or including a respective second value indicating the corresponding location in the sparse depth map includes a zero value; and processing, using the encoder of the neural network model, the image, the depth information, and the validity map to generate the feature representation, wherein the feature representation represents the image, the depth information, and the validity map.

Aspect 28. The non-transitory computer-readable medium of Aspect 27, wherein the instructions further cause the one or more processors to perform operations comprising: generating a channel-wise concatenation of the image, the depth information, and the validity map; and processing, using the encoder of the neural network model, the channel-wise concatenation to generate the feature representation.

Aspect 29. The non-transitory computer-readable medium of Aspect 28, wherein: the channel-wise concatenation includes one or more color channels of the image, a depth channel associated with the sparse depth map, and a validity channel associated with the validity map; and the feature representation includes a plurality of features having the resolution.

Aspect 30. The non-transitory computer-readable medium of any of Aspects 24 to 29, wherein: the depth output includes a depth map having the resolution, each location in the depth map including a value representing a respective depth of a respective pixel having a corresponding location in the image;

Aspect 31. The non-transitory computer-readable medium of any of Aspects 23 to 30, wherein the instructions further cause the one or more processors to perform operations comprising: processing the depth map to generate a 3-dimensional mesh of the scene.

Aspect 32. The non-transitory computer-readable medium of any of Aspects 23 to 31, wherein the instructions further cause the one or more processors to perform operations comprising: obtaining a plurality of seed points, each seed point of the plurality of seed points indicating a respective position and depth of a respective point in the scene; and generating the depth information based on the plurality of seed points.

Aspect 33. The non-transitory computer-readable medium of Aspect 32, wherein, to generate the depth information based on the plurality of seed points, the instructions further cause the one or more processors to perform operations comprising: projecting the plurality of seed points to a two-dimensional image plane associated with the image.

Aspect 34. A non-transitory computer-readable medium having stored thereon instructions which, when executed by one or more processors, cause the one or more processors to perform operations according to any of Aspects 1 to 11.

Aspect 35. A non-transitory computer-readable medium having stored thereon instructions which, when executed by one or more processors, cause the one or more processors to perform operations according to any of Aspects 12 to 22.

Aspect 36. A non-transitory computer-readable medium having stored thereon instructions which, when executed by one or more processors, cause the one or more processors to perform operations according to any of Aspects 23 to 33.

Aspect 37. An apparatus comprising one or more means for performing operations according to any of Aspects 1 to 11.

Aspect 38. An apparatus comprising one or more means for performing operations according to any of Aspects 12 to 22.

Aspect 39. An apparatus comprising one or more means for performing operations according to any of Aspects 23 to 33.

What is claimed is:

1. An apparatus for generating depth information from one or more images, the apparatus comprising:
   at least one memory; and
   at least one processor coupled to the at least one memory, the at least one processor being configured to:
   obtain an image of a scene;
   obtain depth information associated with one or more objects in the scene;
   process, using an encoder of a neural network model, the image and the depth information to generate a feature representation of the image and the depth information;
   process, using a decoder of the neural network model, the feature representation of the image and the depth information to generate a depth output corresponding to the image;
   obtain a plurality of seed points, each seed point of the plurality of seed points indicating a respective position and depth of a respective point in the scene; and
   generate the depth information based on the plurality of seed points.

2. The apparatus of claim 1, wherein the image includes a plurality of pixels having a resolution.

3. The apparatus of claim 2, wherein the depth information includes a sparse depth map comprising a plurality of locations having the resolution, and wherein:
   each location of a first subset of locations of the plurality of locations in the sparse depth map includes a value representing a respective depth of a respective pixel having a corresponding location in the image; and
   each location of a second subset of locations of the plurality of locations in the sparse depth map includes a zero value corresponding to a lack of depth information for a respective pixel having a corresponding location in the image.

4. The apparatus of claim 2, wherein the depth information includes a sparse depth map comprising a plurality of locations having the resolution, and wherein:
   each location of a first subset of locations of the plurality of locations in the sparse depth map includes an inverse of a value representing a respective depth of a respective pixel having a corresponding location in the image; and
   each location of a second subset of locations of the plurality of locations in the sparse depth map includes a zero value corresponding to a lack of depth information for a respective pixel having a corresponding location in the image.

5. The apparatus of claim 3, wherein the at least one processor is configured to:
   obtain a validity map having the resolution, each location of a plurality of locations in the validity map including a respective first value indicating a corresponding location in the sparse depth map includes a valid depth value or including a respective second value indicating the corresponding location in the sparse depth map includes a zero value; and
   process, using the encoder of the neural network model, the image, the depth information, and the validity map to generate the feature representation, wherein the feature representation represents the image, the depth information, and the validity map.

6. The apparatus of claim 5, wherein the at least one processor is configured to:
   generate a channel-wise concatenation of the image, the depth information, and the validity map; and
   process, using the encoder of the neural network model, the channel-wise concatenation to generate the feature representation.

7. The apparatus of claim 6, wherein:
   the channel-wise concatenation includes one or more color channels of the image, a depth channel associated with the sparse depth map, and a validity channel associated with the validity map; and
   the feature representation includes a plurality of features having the resolution.

8. The apparatus of claim 2, wherein the depth output includes a depth map having the resolution, each location in the depth map including a value representing a respective depth of a respective pixel having a corresponding location in the image.

9. The apparatus of claim 1, wherein the at least one processor is configured to:
   process the depth output to generate a 3-dimensional mesh of the scene.

10. The apparatus of claim 1, wherein, to generate the depth information based on the plurality of seed points, the at least one processor is configured to:
    project the plurality of seed points to a two-dimensional image plane associated with the image.

11. A method of generating depth information from one or more images, the method comprising:
- obtaining an image of a scene;
- obtaining depth information associated with one or more objects in the scene;
- processing, using an encoder of a neural network model, the image and the depth information to generate a feature representation of the image and the depth information;
- processing, using a decoder of the neural network model, the feature representation of the image and the depth information to generate a depth output corresponding to the image;
- obtaining a plurality of seed points, each seed point of the plurality of seed points indicating a respective position and depth of a respective point in the scene; and
- generating the depth information based on the plurality of seed points.

12. The method of claim 11, wherein the image includes a plurality of pixels having a resolution.

13. The method of claim 12, wherein the depth information includes a sparse depth map comprising a plurality of locations having the resolution, and wherein:
- each location of a first subset of locations of the plurality of locations in the sparse depth map includes a value representing a respective depth of a respective pixel having a corresponding location in the image; and
- each location of a second subset of locations of the plurality of locations in the sparse depth map includes a zero value corresponding to a lack of depth information for a respective pixel having a corresponding location in the image.

14. The method of claim 13, further comprising:
- obtaining a validity map having the resolution, each location of a plurality of locations in the validity map including a respective first value indicating a corresponding location in the sparse depth map includes a valid depth value or including a respective second value indicating the corresponding location in the sparse depth map includes a zero value; and
- processing, using the encoder of the neural network model, the image, the depth information, and the validity map to generate the feature representation, wherein the feature representation represents the image, the depth information, and the validity map.

15. The method of claim 14, further comprising:
- generating a channel-wise concatenation of the image, the depth information, and the validity map; and
- processing, using the encoder of the neural network model, the channel-wise concatenation to generate the feature representation.

16. The method of claim 15, wherein:
- the channel-wise concatenation includes one or more color channels of the image, a depth channel associated with the sparse depth map, and a validity channel associated with the validity map; and
- the feature representation includes a plurality of features having the resolution.

17. The method of claim 12, wherein the depth information includes a sparse depth map comprising a plurality of locations having the resolution, and wherein:
- each location of a first subset of locations of the plurality of locations in the sparse depth map includes an inverse of a value representing a respective depth of a respective pixel having a corresponding location in the image; and
- each location of a second subset of locations of the plurality of locations in the sparse depth map includes a zero value corresponding to a lack of depth information for a respective pixel having a corresponding location in the image.

18. The method of claim 12, wherein the depth output includes a depth map having the resolution, each location in the depth map including a value representing a respective depth of a respective pixel having a corresponding location in the image.

19. The method of claim 11, further comprising:
- processing the depth output to generate a 3-dimensional mesh of the scene.

20. The method of claim 11, wherein generating the depth information based on the plurality of seed points comprises:
- projecting the plurality of seed points to a two-dimensional image plane associated with the image.

21. A non-transitory computer-readable medium having stored thereon instructions which, when executed by one or more processors, cause the one or more processors to perform operations comprising:
- obtaining an image of a scene;
- obtaining depth information associated with one or more objects in the scene;
- processing, using an encoder of a neural network model, the image and the depth information to generate a feature representation of the image and the depth information;
- processing, using a decoder of the neural network model, the feature representation of the image and the depth information to generate a depth output corresponding to the image;
- obtaining a plurality of seed points, each seed point of the plurality of seed points indicating a respective position and depth of a respective point in the scene; and
- generating the depth information based on the plurality of seed points.

22. The non-transitory computer-readable medium of claim 21, wherein the image includes a plurality of pixels having a resolution.

23. The non-transitory computer-readable medium of claim 22, wherein the depth information includes a sparse depth map comprising a plurality of locations having the resolution, and wherein:
- each location of a first subset of locations of the plurality of locations in the sparse depth map includes a value representing a respective depth of a respective pixel having a corresponding location in the image; and
- each location of a second subset of locations of the plurality of locations in the sparse depth map includes a zero value corresponding to a lack of depth information for a respective pixel having a corresponding location in the image.

24. The non-transitory computer-readable medium of claim 23, wherein the sparse depth map is an inverse sparse depth map, and wherein each location of the first subset of locations includes an inverse of the respective depth of the respective pixel having the corresponding location in the image.

25. The non-transitory computer-readable medium of claim 23, wherein the instructions further cause the one or more processors to perform operations comprising:
- obtaining a validity map having the resolution, each location of a plurality of locations in the validity map including a respective first value indicating a corresponding location in the sparse depth map includes a valid depth value or including a respective second value indicating the corresponding location in the sparse depth map includes a zero value; and processing, using the encoder of the neural network model, the image, the depth information, and the validity map to generate the feature representation, wherein the feature representation represents the image, the depth information, and the validity map.

26. The non-transitory computer-readable medium of claim 25, wherein the instructions further cause the one or more processors to perform operations comprising:

generating a channel-wise concatenation of the image, the depth information, and the validity map, wherein the channel-wise concatenation includes one or more color channels of the image, a depth channel associated with the sparse depth map, and a validity channel associated with the validity map; and processing, using the encoder of the neural network model, the channel-wise concatenation to generate the feature representation, wherein the feature representation includes a plurality of features having the resolution.

27. The non-transitory computer-readable medium of claim 22, wherein:

the depth output includes a depth map having the resolution, each location in the depth map including a value representing a respective depth of a respective pixel having a corresponding location in the image; and the instructions further cause the one or more processors to perform operations comprising processing the depth map to generate a 3-dimensional mesh of the scene.

28. An apparatus for generating depth information from one or more images, the apparatus comprising:

at least one memory; and at least one processor coupled to the at least one memory, the at least one processor being configured to:

obtain an image of a scene, wherein the image includes a plurality of pixels having a resolution;

obtain depth information associated with one or more objects in the scene;

process, using an encoder of a neural network model, the image and the depth information to generate a feature representation of the image and the depth information, wherein the depth information includes a sparse depth map comprising a plurality of locations having the resolution, and wherein:

each location of a first subset of locations of the plurality of locations in the sparse depth map includes a value representing a respective depth of a respective pixel having a corresponding location in the image; and each location of a second subset of locations of the plurality of locations in the sparse depth map includes a zero value corresponding to a lack of depth information for a respective pixel having a corresponding location in the image; and process, using a decoder of the neural network model, the feature representation of the image and the depth information to generate a depth output corresponding to the image.

* * * * *